United States Patent [19]

Klein et al.

[11] 4,304,131
[45] Dec. 8, 1981

[54] FRICTION BEARING FOR ROTOR PIVOT OF LIQUID COUNTER

[75] Inventors: Wolfgang Klein, Düsseldorf; Klaus Tocha, Langenfeld, both of Fed. Rep. of Germany

[73] Assignee: Messer Griesheim GmbH, Frankfurt am Main, Fed. Rep. of Germany

[21] Appl. No.: 94,102

[22] Filed: Nov. 14, 1979

[30] Foreign Application Priority Data

Nov. 28, 1978 [DE] Fed. Rep. of Germany ....... 2851352

[51] Int. Cl.³ ............................................. G01F 15/00
[52] U.S. Cl. ................................................. 73/272 R
[58] Field of Search ........... 73/861.86, 861.87, 861.92, 73/272 R; 308/36, 37, 139, 163, 238

[56] References Cited

U.S. PATENT DOCUMENTS

| 1,232,312 | 7/1917 | Howard | 308/139 X |
| 3,353,879 | 11/1967 | Jorn | 308/238 X |
| 3,359,047 | 12/1967 | Andersen | 308/36 |
| 3,363,950 | 1/1968 | Cole | 308/163 |
| 3,546,940 | 12/1970 | Short | 73/861.92 |

*Primary Examiner*—Herbert Goldstein
*Attorney, Agent, or Firm*—Connolly and Hutz

[57] ABSTRACT

A liquid counter having a rotor pivot operating in a stream of cryogenic medium includes a friction bearing for the rotor pivot loosely mounted in a housing while the liquid counter is operative but arrested in the housing both radially and axially.

3 Claims, 1 Drawing Figure

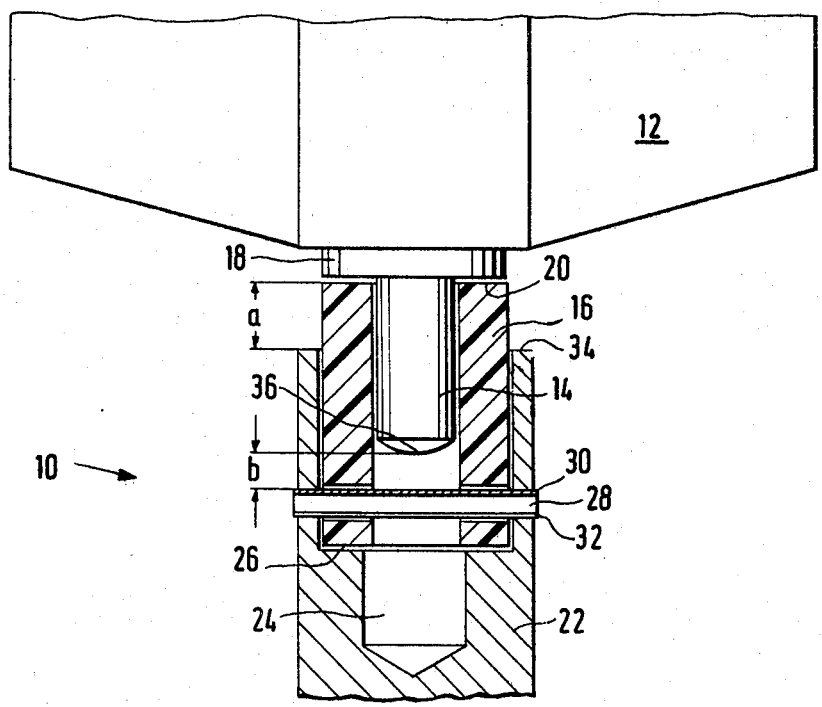

FRICTION BEARING FOR ROTOR PIVOT OF LIQUID COUNTER

BACKGROUND OF INVENTION

The present invention concerns a friction bearing for the rotor pivot of the liquid counter in a cryogenic medium.

The known liquid counters for cryogenic media are subject to high temperature loads. The rotor in the liquid counter, by which the liquid flow is measured quantitatively, is supported by its rotor pivot in a friction bearing usually made of plastic material. This friction bearing proper is inserted in a metallic holder by friction contact, namely by press fit or by gluing in.

The fastening of the friction bearing, which is located inside the liquid counter by press fit, is totally unsuitable when the liquid counter is used in cryogenic media because the friction bearing (made of plastic) is subject to a considerably greater shrinkage in the outside diameter than is the metallic holder enclosing it. This is due to the fact that the plastic materials used for the friction bearings have a thermal expansion coefficient in the order of magnitude of $10^{-4}$ to $10^{-5}$ C.$^{-1}$. The expansion coefficient of the material of the metallic holder is substantially smaller, so that the change in length of the plastic friction bearing due to the cooling of these components by a cryogenic medium is about 3 to 20 times as large as that of the metallic holder.

If the differences in the thermal expansion coefficients (of the friction bearing and of the metallic holder) are taken into consideration in the design, i.e., if the bearing is dimensioned for the operating state (i.e., for a temperature of approximately $-200°$ C.), the fit ratio at normal temperature ($20°$ C.) imposes a high external tension load on the plastic material. Since plastics are unable to take up major compressive forces, plastic flow begins under load, which leads to the loss of the intended bearing geometry as well as of the desired fit ratio. The temperature and load cycles occurring during the intermittent use of the liquid counter moreover lead to material fatigue. Depending on the type of plastic used for the friction bearing, cracks are generated, which grow into crumbled spots due to the penetration of liquid, particularly in the especially suitable multicomponent materials (e.g., metal-impregnated synthetic carbon, PTTE compounds, etc.).

The connection of the friction bearing with the metallic holder holding it by gluing, which is otherwise a usual method, is impossible in connection with cryogenic media, especially when a liquid oxygen flow is measured by the liquid counter. This is due to the fact that there are no adhesives available which are resistant to oxygen and are also elastic down to temperatures as low as $-200°$ C. and thus able to neutralize the fit play occurring during frequent load cycles.

The radial and axial fastening of the friction bearing in the metallic holder (housing) is, however, unavoidably necessary, because the mountings used in high-precision liquid counters are required not only to have low-friction operation and a constant friction coefficient, but also constant frictional forces during the entire lifetime of the bearing.

SUMMARY OF INVENTION

It is, therefore, the object of the present invention to create a friction bearing for the rotor pivot of a liquid counter used in a stream of cryogenic medium on the basis of the above-described state of the art, but wherein the friction bearing remains fully operable over a wide temperature range (from $+20°$ C. to approximately $-200°$ C.), thereby to ensure a precise measurement during its entire running time, and which has a considerably prolonged life compared with the known friction bearings.

According to the present invention, this object is solved in such a way that with the liquid counter in working condition, the friction bearing is inserted with play in a housing, and is secured in the latter axially and radially.

In the preferred embodiment of the present invention, there is a sleeve connecting the housing and the friction bearing with each other.

In order to permit the removal of the friction heat of the bearing, which is generated during the operation of the liquid counter, and also the flushing out of the fines worn off from the bearing, it is proposed according to the present invention that the sleeve have a longitudinal slit which lies, in the installation position, turned away from the rotor pivot.

In the friction bearing design according to the present invention, it is also envisaged that the distance between the front side of the rotor pivot and the sleeve is smaller than the distance between the front side of the friction bearing and the edge of the housing. Through this construction, it is guaranteed that the friction bearing will have a substantially longer life, because after the usual wear of the friction bearing, the rotor pivot will come to lie on the sleeve and thus be supported by the said sleeve. The front side of the rotor pivot, which is preferably made convex, will thus cause a minimum of frictional contact with the sleeve without prejudice to the operating accuracy of the rotor pivot and thus of the rotor for the measurement of the medium.

THE DRAWING

The single FIGURE illustrates a sectional view of the friction bearing according to the present invention with the rotor pivot of a liquid counter.

DETAILED DESCRIPTION

In the drawing, a support 10 is shown, which serves to hold and guide a rotor 12. This rotor is part of a liquid counter (not shown) for the flow measurement of cryogenic media and has a rotor pivot 14 at its lower end.

This rotor pivot is taken up completely by a friction bearing 16 in such a manner that a shoulder 18 of the rotor pivot 14 lies against the front end 20 of the friction bearing 16.

As illustrated, the friction bearing 16, manufactured from a plastic material (e.g., PTTE compounds), has the shape of a sleeve, in whose inner bore the rotor pivot 14 is inserted.

A cylindrical housing 22, which is made preferably of metal, and which is provided with a stepped inner bore 24, serves to mount the sleeve-shaped friction bearing 16. On step 26 of the inner bore 24 rests the inner end of the friction bearing 16.

The outside diameter of the friction bearing 16 and the diameter of the inner bore 24 (in the expanded step range) is always chosen such that the friction bearing 16 sits in the housing 22 loosely, i.e., with play, when the liquid counter is in operating condition (approximately $-200°$ C.). Based on the knowledge of the different thermal expansion coefficients of the materials of the friction bearing and of the housing, this state can be achieved without any difficulty.

In order to prevent the friction bearing 16 from moving radially and/or axially within the housing 22 while in operating condition, a sleeve 28 is provided according to the present invention, which said sleeve serves to arrest the friction bearing in the housing. It is seen that the housing 22 and the friction bearing 16 each are provided with continuous bores which are generally coaxial or aligned with each other as assembled. The sleeve 28 is pushed through this bore configuration as shown in the drawing. Thus, the friction bearing 16 is secured in the housing 22 by the sleeve 28, and thus fixed in its radial and/or axial direction. Under operating conditions (approximately −200° C.) the friction bearing 16 still has some pendular motion around the longitudinal axis 30 of the sleeve 28 as well as a motion within the overall fit play, which is made possible by the selection of the outside diameter of the friction bearing relative to the diameter of the inner bore 24 of the housing 22. This freedom of motion is necessary to equalize manufacturing tolerances in the manufacture of the friction bearing. As is further indicated in the drawing, the sleeve 28 is provided with a longitudinal slit 32, which is on the side turned away from the rotor pivot 14 in the installation position of the sleeve. In the embodiment of the support 10 according to the present invention, the distance "a" between the end face 20 of the friction bearing 16 and the edge 34 of the housing is greater than the distance "b" between the convex end face 36 of the rotor pivot 14 and the sleeve 28.

Due to the wearing of the friction bearing 16 during the operation of the liquid counter due to the friction of the shoulder 18 on the end face 20, the rotor 12 "sinks" in the direction of the sleeve 28 until the distance "b" (greater than distance "a") becomes zero, and thereby the convex end face 36 comes into contact with the sleeve 28. Thus, the rotor pivot 14 is running, with its convex end face 36, on the sleeve 28. In view of the fact that the friction surface is small due to the convexity of the end face 36, the rotor 12 rotates without any major frictional loss, i.e., the pre-existing friction value does not change when the shoulder 18 comes to rest on the end face 20 of the housing 22. This results in an advantageous, substantial prolongation of the life of the iquid counter.

Since, as mentioned above, the longitudinal slit 32 of the sleeve 28 is on the side of the sleeve that is turned away from the convex end face 36, there is an axial load distribution starting from the rotor pivot 14. This longitudinal slit also brings about an elastic frictional arrangement of the sleeve 28 in the housing 22, so that there can be no loosening during temperature variations. Due to the bearing wear, fines are generated, which can be flushed out from the inside of the bearing, preferably through the hollow, longitudinally slit sleeve 28. The sleeve 28 also makes it possible to build up a hydrodynamic lubricating film (liquid cushion), which not only results in an improvement in the gliding ability of the bearing, but also permits the removal of the frictional heat of the bearing, which is generated during the operation of the liquid counter.

What is claimed is:

1. In the liquid counter having a rotor pivot operating in a stream of cryogenic medium with the rotor pivot mounted in a friction bearing, the improvement being said friction bearing being loosely mounted in a housing while said liquid counter is in operating condition, means for axially and radially arresting said friction bearing in said housing, a sleeve connecting said housing and said friction bearing with each other, said rotor pivot having an end face within said friction bearing, said housing having an end edge disposed toward the rotor of said counter, said friction bearing having an end face disposed toward said rotor, and the distance between said end face of said rotor pivot and said sleeve being smaller than the distance between said end face of said friction bearing and said edge of said housing.

2. In a liquid counter having a rotor pivot operating in a stream of cyrogenic medium wit the rotor pivot loosely mounted in a friction bearing, said friction bearing being loosely mounted in a housing and arrested both axially and radially by means inserted through said friction bearing and said housing diameterically, the improvement being said means consisting of a sleeve having a longitudinal slit located on its side remote from said rotor pivot.

3. In the liquid counter according to claim 2, characterized in that said rotor pivot has an end face within said friction bearing, said housing having an end edge disposed toward the rotor of said counter, said friction bearing having an end face disposed toward said rotor, and the distance between said end face of said rotor pivot and said sleeve being smaller than the distance between said end face of said friction bearing and said edge of said housing.

* * * * *